(12) United States Patent
Dumont et al.

(10) Patent No.: US 10,397,550 B2
(45) Date of Patent: Aug. 27, 2019

(54) APPARATUS AND METHOD FOR THREE DIMENSIONAL SURFACE MEASUREMENT

(71) Applicant: BP Corporation North America, Inc., Houston, TX (US)

(72) Inventors: Arnaud Dumont, Marina Del Rey, CA (US); Fred Jallon, Mauves sur Loire (FR); Patrick Raymond, Cypress, TX (US); Jason Kestner, Pearland, TX (US); Madhav Parimi, Katy, TX (US)

(73) Assignee: BP Corporation North America Inc., Houston, TX (US)

( * ) Notice: Subject to any disclaimer, the term of this patent is extended or adjusted under 35 U.S.C. 154(b) by 818 days.

(21) Appl. No.: 14/107,357

(22) Filed: Dec. 16, 2013

(65) Prior Publication Data
US 2015/0317780 A1    Nov. 5, 2015

Related U.S. Application Data (60) Provisional application No. 61/737,499, filed on Dec. 14, 2012.

(51) Int. Cl.
| | | |
|---|---|---|
| G06T 7/80 | (2017.01) | |
| G01B 11/25 | (2006.01) | |
| G01C 11/06 | (2006.01) | |
| G01C 11/30 | (2006.01) | |
| G06T 7/521 | (2017.01) | |

(Continued)

(52) U.S. Cl.
CPC ........... *H04N 13/246* (2018.05); *G01B 11/25* (2013.01); *G01C 11/06* (2013.01); *G01C 11/30* (2013.01); *G06T 7/521* (2017.01); *G06T 7/586* (2017.01); *G06T 7/85* (2017.01); *H04N 5/2253* (2013.01); *H04N 5/2256* (2013.01);
(Continued)

(58) Field of Classification Search
CPC .......... G06T 7/00; H04N 13/02; H04N 5/225; G01C 11/30
See application file for complete search history.

(56) References Cited

U.S. PATENT DOCUMENTS 4,979,815 A * 12/1990 Tsikos ................ G01B 11/2522
356/2
6,590,640 B1    7/2003 Aiken et al.
(Continued)

OTHER PUBLICATIONS

Kraus K. "Photogrammetry: Geometry from Images and Laser Scans" Second Edition, 2007.*
(Continued)

*Primary Examiner* — Richard A Hansell, Jr.
(74) *Attorney, Agent, or Firm* — John L. Wood (57) ABSTRACT

A system and method for three-dimensional measurement of surfaces. In one embodiment, a measurement system includes a laser projector, a first camera, and a processor. The laser projector is configured to emit a laser projection onto a surface for laser triangulation. The first camera is configured to provide images of the surface, and is disposed at an oblique angle with respect to the laser projector. The processor is configured to apply photogrammetric processing to the images, to compute calibrations for laser triangulation based on a result of the photogrammetric processing, and to compute, based on the calibrations, coordinates of points of the surface illuminated by the laser projection via laser triangulation.

16 Claims, 10 Drawing Sheets

(51) Int. Cl.
  *G06T 7/586* (2017.01)
  *H04N 5/225* (2006.01)
  *H04N 13/246* (2018.01)

(52) U.S. Cl.
  CPC .............. *G06T 2207/10012* (2013.01); *G06T 2207/10021* (2013.01); *G06T 2207/10032* (2013.01)

(56) References Cited

U.S. PATENT DOCUMENTS

| | | | | |
|---|---|---|---|---|
| 6,757,445 | B1* | 6/2004 | Knopp | G01C 11/06 |
| | | | | 382/154 |
| 8,659,764 | B2* | 2/2014 | Hatzilias | G01B 11/25 |
| | | | | 356/601 |
| 2004/0213463 | A1* | 10/2004 | Morrison | G01B 11/25 |
| | | | | 382/210 |
| 2004/0223661 | A1* | 11/2004 | Kraft | G06T 3/0093 |
| | | | | 382/287 |
| 2005/0270375 | A1* | 12/2005 | Poulin | G01B 11/2504 |
| | | | | 348/187 |
| 2006/0268285 | A1* | 11/2006 | Karabassi | G01B 11/2504 |
| | | | | 356/601 |
| 2007/0104353 | A1* | 5/2007 | Vogel | G01C 1/04 |
| | | | | 382/106 |
| 2009/0273792 | A1* | 11/2009 | Hullin | G01B 11/2504 |
| | | | | 356/601 |
| 2009/0323121 | A1* | 12/2009 | Valkenburg | G01B 11/002 |
| | | | | 358/1.18 |
| 2010/0074532 | A1* | 3/2010 | Gordon | G01B 11/25 |
| | | | | 382/203 |
| 2010/0134598 | A1* | 6/2010 | St-Pierre | G01B 11/2513 |
| | | | | 348/47 |
| 2010/0238269 | A1* | 9/2010 | Miralles | G01B 11/25 |
| | | | | 348/44 |
| 2011/0134225 | A1* | 6/2011 | Saint-Pierre | G01B 11/03 |
| | | | | 348/47 |
| 2012/0199657 | A1* | 8/2012 | He | G06K 7/10722 |
| | | | | 235/470 |
| 2013/0124159 | A1* | 5/2013 | Chen | G06T 5/006 |
| | | | | 703/2 |
| 2014/0285655 | A1* | 9/2014 | Son | G01B 11/24 |
| | | | | 348/81 |

OTHER PUBLICATIONS

Horn B.K.P. "Closed-form solution of absolute orientation using unit quaternions" vol. 4, No. 4, J. Opt. Soc. Am. A, Apr. 1987.*
Kraus K. "Photogrammetry: Geometry from Images and Laser Scans" Second Edition, 2007 (Year: 2007).*
Horn B.K.P. "Closed-form solution of absolute orientation using unit quaternions" vol. 4, No. 4, J. Opt. Soc. Am. A, Apr. 1987 (Year: 1987).*

* cited by examiner

1202 — Move laser source and first camera along surface to be measured

1204 — Illuminate surface with laser projection and capture images of the surface with first camera 1206 — Identify points of the surface across images and apply photogrammetric processing 1208 — Compute calibrations for laser triangulation based on results of the photogrammetric processing 1210 — Compute, via laser triangulation applying the calibrations, 3D coordinates of points illuminated by the laser

FIG. 12

APPARATUS AND METHOD FOR THREE DIMENSIONAL SURFACE MEASUREMENT

CROSS REFERENCE TO RELATED APPLICATIONS

The present application claims priority to U.S. Provisional Patent Application No. 61/737,499, filed on Dec. 14, 2012, entitled "Apparatus and Method for Measuring Subsea Structures," which is hereby incorporated herein by reference in its entirety.

BACKGROUND

Various optical methods may be applied to measurement and/or modeling of an object. Photogrammetry is a technique that extracts measurements from photographs of an object. For example, photogrammetry may be used to produce maps (e.g., aerial photogrammetry) and/or to produce models of industrial installations (close-range photogrammetry) from photographs. In photogrammetry, images of a scene are captured from different angles and two-dimensional measurements of objects are converted into three-dimensional coordinates via bundle adjustment mathematical routines. Photogrammetry requires the use of targets to correlate the images and is limited to the measurement of visual indicators such as points and natural features (i.e. corners, edges, cylinders). Close-range Photogrammetry can provide good results when multiple images from different angles that produce good intersection geometry and high redundancy are provided. Stereoscopic photogrammetry allows the measurement of points on surfaces but has limitations in terms of accuracy because the stereoscopic sensor has only two lines of sight that are quasi-parallel.

Laser Triangulation is an optical technique that may be used for high density measurement of small surfaces. In laser triangulation, a laser source that projects, for example, a line, dot, or pattern, is mounted with an optical sensor (e.g., a camera) in accordance with a predetermined calibrated geometry. The laser projection is triangulated by the optical sensor. To provide multiple measurements, a rotating mirror may be mounted in front of the laser, allowing the optical sensor to "scan" a large surface with a high density of points.

SUMMARY

A system and method for three-dimensional measurement and modeling of surfaces and objects are disclosed herein. In one embodiment, a measurement system includes a laser projector, a first camera, and a processor. The laser projector is configured to emit a laser projection onto a surface for laser triangulation. The first camera is configured to provide images of the surface, and is disposed at an oblique angle with respect to the laser projector. The processor is configured to apply photogrammetric processing to the images, to compute calibrations for laser triangulation based on a result of the photogrammetric processing, and to compute, based on the calibrations, coordinates of points of the surface illuminated by the laser projection via laser triangulation.

In another embodiment, a method for laser triangulation includes capturing images of a surface, via a first camera, as the first camera moves along the surface. The surface is illuminated by a laser projection produced by a laser source that moves along the surface in conjunction with the first camera. Photogrammetric processing is applied to the images. Calibrations for laser triangulation are computed based on a result of the photogrammetric processing. Via the laser triangulation, coordinates of points of the surface illuminated by the laser projection are computed based on the calibrations.

In a further embodiment, a non-transitory computer readable medium is encoded with instructions that when executed cause a processor to extract images of a surface from an image stream received from a first camera. The instructions also cause the processor to apply photogrammetric processing to the images, and to compute calibrations for laser triangulation based on a result of the photogrammetric processing. The instructions yet further cause the processor to compute, via laser triangulation, based on the calibrations, coordinates of points of the surface illuminated by a laser projection captured in the images.

BRIEF DESCRIPTION OF THE DRAWINGS

For a detailed description of exemplary embodiments, reference will now be made to the accompanying drawings in which.

NOTATION AND NOMENCLATURE

In the following discussion and in the claims, the terms "including" and "comprising" are used in an open-ended fashion, and thus should be interpreted to mean "including, but not limited to . . . ". Any use of any form of the terms "connect", "engage", "couple", "attach", or any other term describing an interaction between elements is not meant to limit the interaction to direct interaction between the elements and may also include indirect interaction between the elements described. The term "software" includes any executable code capable of running on a processor, regardless of the media used to store the software. Thus, code stored in memory (e.g., non-volatile memory), and sometimes referred to as "embedded firmware," is included within the definition of software. The recitation "based on" is intended to mean "based at least in part on." Therefore, if X is based on Y, X may be based on Y and any number of additional factors.

DETAILED DESCRIPTION

In the drawings and description that follow, like parts are typically marked throughout the specification and drawings with the same reference numerals. The drawing figures are not necessarily to scale. Certain features of the invention may be shown exaggerated in scale or in somewhat schematic form, and some details of conventional elements may not be shown in the interest of clarity and conciseness. The present disclosure is susceptible to embodiments of different forms. Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings and components of the embodiments discussed below may be employed separately or in any suitable combination to produce desired results.

While optical techniques, such as photogrammetry and laser triangulation, may be applied to measure objects, such techniques present difficulties that make their use problematic, especially in harsh environments, such as subsea. For example, photogrammetry requires the addition of targets to the scene in order to correlate the images, and is limited to the measurement of visual indicators such as points and natural features (i.e. corners, edges, cylinders). Furthermore, photogrammetry may require that, prior to measurement, a procedure for underwater calibration be performed under conditions that are as close as possible to the conditions under which the photogrammetric measurements are to be made. Conventional laser triangulation may also be used in subsea and other harsh environments, but requires a high degree of sensor stability, and calibration of the sensor prior to measurement under conditions that are as close as possible to the conditions under which the laser triangulations are to be performed. These limitations make use of conventional photogrammetric and laser triangulation techniques difficult to implement in subsea and other harsh environments.

Embodiments of the present disclosure include a method and apparatus for providing three-dimensional measurement and modeling of objects in subsea and other hazardous environments. The measurement apparatus disclosed herein may be transported and/or operated, for example, by a human operator, an unmanned aerial vehicle (UAV), an underwater remotely operated vehicle (ROV), etc. Embodiments allow the measurement of both entities (such as points, lines, edges, cylinders, etc.) and a high density of points on surfaces, in various environments (e.g., subsea and other hazardous environments) without pre-calibration. Embodiments enable operation without pre-calibration by combining photogrammetry and laser triangulation to provide a novel self-calibration technique.

Figure 1:
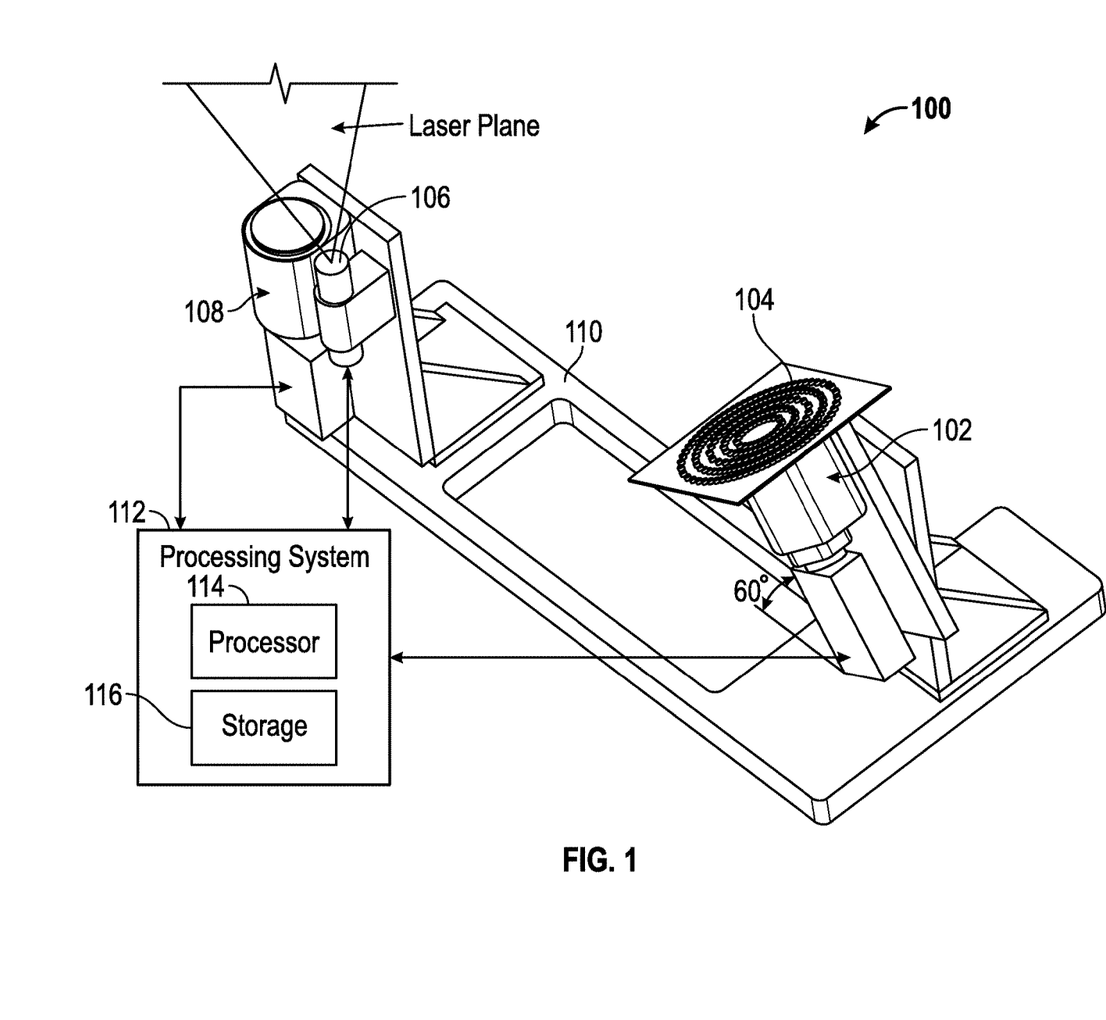
FIG. 1 shows a schematic representation of an apparatus that provides surface measurements in accordance with principles disclosed herein.

FIG. 1 shows a schematic representation of an apparatus 100 that provides surface measurements in accordance with principles disclosed herein. The measurement apparatus 100 includes a camera 102 and a laser projector 106. A light source 104 may be included in the apparatus 100 for operation in conjunction with the camera 102. Some embodiments may additionally include a second camera 108 proximate the laser projector 106. The optical axis of the camera 108 may be substantially parallel (e.g. within 2° of parallel) to the laser projection generated by the laser projector 106. Each camera 102, 108 may be capable of capturing high-definition video (e.g., 1,280×720 pixels, 1,920×1,080 pixels, or higher). Each of the cameras 102 and 108 includes an image sensor, such as a charge-coupled device (CCD) sensor, a complementary metal oxide semiconductor (CMOS) sensor, or other suitable image sensor. The laser projector 106 may include a laser diode or other laser source, and a rotating mirror or other apparatus that produces a laser image defining a plane in space.

The camera 102 is disposed at a predetermined distance and angle from the laser projector 106. The distance (d) between the camera 102 and the laser projector 106 depends on the distance (D) between the image sensor of the camera 102 and the object to be measured. For example, d may be from one-third to one-half of D. Similarly, the camera 102 is disposed at a predetermined angle with respect to the laser projector 106. For example, the camera 102 may be disposed to view the laser plane projected by the laser projector 106 at approximately a 30° angle (i.e., the angle between the laser plane the optical axis of the camera 102 is approximately 30° (e.g., 30°±3°) to generate good intersection geometry). Accordingly, if the laser projector 106 is disposed substantially perpendicular to a mounting structure 110, then the camera 102 may be disposed at approximately a 60° angle relative to the mounting structure 110. The apparatus 100 may be disposed in canisters or other housings for use in underwater, nuclear, thermal-vacuum, or other harsh environments.

The apparatus 100 also includes a processing system 112 coupled to the cameras 102, 108 and laser projector 106. The processing system 112 may control the generation of the laser projection by the laser projector 106 and control capture of images by the cameras 102, 108. The processing system 112 includes a processor 114 and storage 116. The storage 116 may be a semiconductor memory or other storage device (e.g., optical, magnetic, etc.) that stores images captured by the cameras 102, 108 and/or stores instructions for processing the captured images. For example, instructions for photogrammetric processing, computing laser triangulation calibrations based on results of photogrammetric processing, and performing calibrated laser triangulation as disclosed herein may be stored in the storage 116 for execution by the processor 114.

The processor 114 may be a general purpose microprocessor, a digital signal processor, or other suitable instruction execution device. The processing system 112 may be disposed proximate to the camera 102 and laser projector 106 (e.g., in a common housing), or disposed remote from the camera 102 and the laser projector 106. For example, the processing system 112 may be remotely coupled to the cameras 102, 108 via cabling or other communication media (e.g., via radio frequency communication). In some embodiments, the cameras 102, 108 or memory associated with the cameras 102, 108 may store captured images for later processing by the processing system 112. The processing performed by the processing system 112 includes in-situ calibration of the optical sensor to enable laser triangulation. In some embodiments, the processing system 112 may be a computer such as a desktop computer, a notebook computer, a rackmount computer, a server computer, an embedded computer, etc.

To perform laser triangulation with in-situ calibration, the apparatus 100 (via the processing system 112) first applies a photogrammetry technique (i.e. the 3D processing of images from the video captured by the cameras 102, 108) that provides 3D coordinates of points (as well as for other entities) and the 3D locations and orientations of the camera 102 in space with respect to the set of 3D points. As part of the photogrammetry computation, the processing system 112, executes a calibration routine that computes the opto-mechanical parameters of the camera 102 as well as the precise location and orientation of the laser projector 106 with respect to the camera 102. The opto-mechanical parameters of the camera include: c (principal distance), xp, yp (fiducial center), K1, K2, K3 (radial distortion), P1, P2 (decentering distortions), and other parameters such as AP1, AP2 (orthogonality of pixels). Having determined the location and the orientation of the laser projector 106 with respect to the camera 102, the processing system 112 can, on every image, triangulate points on a laser line projected on a surface to be measured at any required resolution: The "laser triangulated points" will be in the same system axis as the "photogrammetry points". By selecting images from the video at a chosen rate the apparatus 100 can obtain a high density of 3D points on any surface.

Laser triangulation with in-situ calibration, can be further described as follows. The apparatus 100 is brought to a suitable distance from the measurement scene. The laser projector 106 projects a laser line onto the object/surface to be measured. The camera 102 records High Definition video including the laser line projected on the object. The apparatus 100 moves around or along the object (in case of linear objects such as pipes) while recording the video. The apparatus 100 may be manually moved or moved by any type of carrier or robot (UAV, ROV, etc.). The processing system 112 extracts images from the images provided by the camera 102. For example, if the camera 102 provides a high-definition video stream, then the processing system 7 can extract individual images, or pictures, from the video stream. In some embodiments, the images may be manually extracted or extracted by a different system and provided to the processing system 112.

The processing system 112 identifies common "photogrammetry points" on all the images via image processing algorithms. Once these points are identified, the processing system performs photogrammetry computations and produces the following outputs:

The 3D coordinates of the photogrammetry points;
The 3D coordinates and orientations of the camera locations;
The calibration of the sensor (i.e. the opto-mechanical parameters of the camera and the position and orientation of the laser plane with respect to the camera);
The 3D coordinates of the "Laser Triangulation points".

Figure 2:
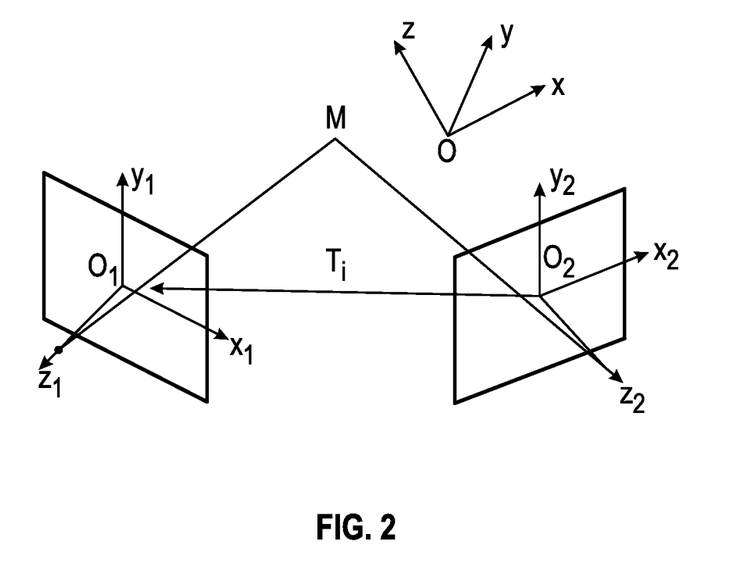
FIG. 2 shows an illustrative representation of a photogrammetry system axis in accordance with principles disclosed herein.

The processing system 112 may apply photogrammetric processing as follows. FIG. 2 shows an illustrative representation of a photogrammetry system axis in accordance with principles disclosed herein. Each of cameras 102 and 108 has its own system axis, centered and oriented on the image sensor of the camera. During image capture, the position and orientation of a camera 102, 108 is given in the World System Axis. The "World System Axis" is referenced as: (O X Y Z), and the "Camera System Axis" is referenced as: (o x y z).

The photogrammetry collinearity equations applied by the processing system 112 describe the fact that a point measured on the camera image sensor (the perspective center) and a point imaged on the object are on the same line. The point measured on the camera image sensor is compensated for optical distortions and manufacturing defects. The photogrammetry collinearity equations may be expressed as:

$$c, m, M \text{ aligned} \leftrightarrow \overrightarrow{cm} = kR\overrightarrow{CM} \leftrightarrow \begin{pmatrix} x+dx \\ y+dy \\ -c \end{pmatrix} = kR^T \begin{pmatrix} X_M - X_C \\ Y_M - Y_C \\ Z_M - Z_C \end{pmatrix} \leftrightarrow \quad (1)$$

$$\begin{cases} x + dx = \dfrac{r_{11}(X_M - X_C) + r_{21}(Y_M - Y_C) + r_{31}(Z_M - Z_C)}{r_{13}(X_M - X_C) + r_{23}(Y_M - Y_C) + r_{33}(Z_M - Z_C)} \\ y + dy = \dfrac{r_{12}(X_M - X_C) + r_{22}(Y_M - Y_C) + r_{32}(Z_M - Z_C)}{r_{13}(X_M - X_C) + r_{23}(Y_M - Y_C) + r_{33}(Z_M - Z_C)} \end{cases}$$

where:
$(x, y)^T$ are coordinates of the point m, in the Camera System Axis;
$(dx, dy)^T$ are corrections of the optical distortions;
R is a rotation matrix of the camera system axis to the World System Axis;
$(X_M, Y_M, Z_M)^T$ are coordinates of the point M in the World System Axis;
$(X_C, Y_C, Z_C)^T$ are coordinates of the perspective center of the camera (during the image capture); and
k is a scale factor between $\overrightarrow{cm}$ and $\overrightarrow{CM}$.

There are three types of distortion to be corrected in the system 100: radial distortion, decentering distortion, and manufacturing defects of the image sensors. The processing system 112 applies compensation to coordinates previously compensated for the decentering of the principal point (projection of the perspective center on the CCD). With $(xp, yp)^T$ being the coordinates of the perspective center (or fiducial center) in the Camera System Axis, the compensation formulae include:

$$\begin{cases} x = x - xp \\ y = y - yp \end{cases}, \text{ and} \quad (2)$$

$$r^2 = x^2 + y^2 \quad (3)$$

$$\begin{cases} dx = rdx + ddx + pdx \\ dy = rdy + ddy \end{cases} \quad (4)$$

where:
$(rdx, rdy)^T$ is a radial distortion vector;
$(ddx, ddy)^T$ is a decentering distortion vector; and
$(pdx, O)^T$ is a pixel distortion vector
with:

$$\begin{cases} rdx = x(K_1 r^2 + K_2 r^4 + K_3 r^6) \\ rdy = y(K_1 r^2 + K_2 r^4 + K_3 r^6) \end{cases} \quad (5)$$

$$\begin{cases} ddx = P_1(r^2 + 2x^2) + 2P_2 xy \\ ddy = P_2(r^2 + 2y^2) + 2P_1 xy \end{cases} \quad (6)$$

$$\{pdx = AP_1 x + AP_2 y \quad (7)$$

Figure 3:
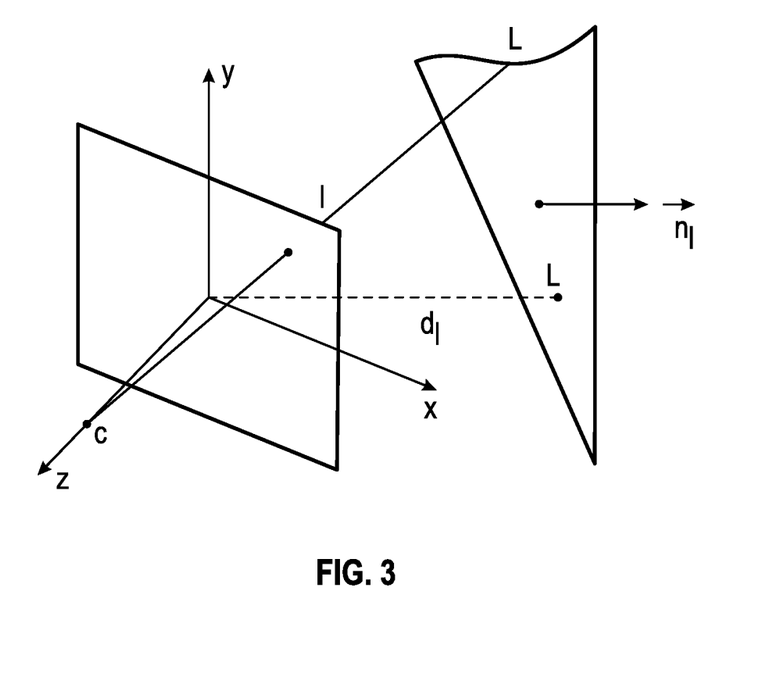
FIG. 3 shows an illustrative representation of laser plane positioning in accordance with principles disclosed herein.

The processing system 112 may compute calibrations for laser triangulation as follows. The laser projected in space forms a plane. The processing system 112 calibrates the laser plane by computing its position in the camera system axis. FIG. 3 shows an illustrative representation of laser plane positioning with respect to the camera 102 in accordance with principles disclosed herein. The laser plane is defined by (mathematical minimum) the distance dl to the origin of the Camera System Axis and the normal line $\vec{nl}$ in the Camera System Axis.

Figure 4:
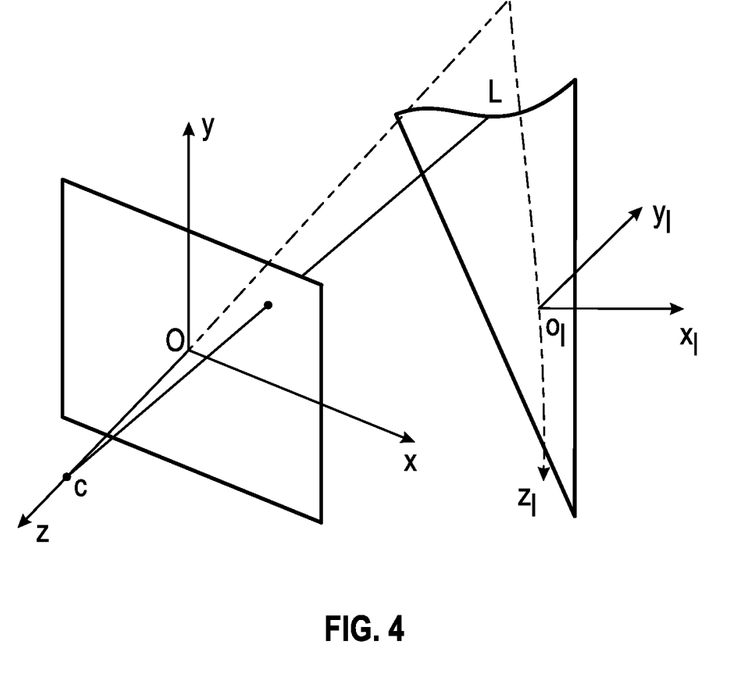
FIG. 4 shows an illustrative representation of a laser axis definition in accordance with principles disclosed herein.

FIG. 4 shows an illustrative representation of a laser axis definition in accordance with principles disclosed herein. In defining a system axis for the laser, the origin of the laser axis is the projection on the laser plane of the origin of the Camera System Axis, the OZ axis of the laser plane intersects the OZ axis, and the OX axis is perpendicular to the laser plane. In accordance with this definition, metrology characteristics such as convergence (between the OZ axis and the laser plane OZ axis), the base (distance between camera origin and laser origin) can be generated. (ol, xl, zl) are defined as follows:

(ol, xl) axis going through o and the projection of o on the laser plane, and (ol, zl) axis concurring with the Camera Optical Axis.

Coordinates of a point may be computed in accordance with either the Camera System Axis or in the Laser System Axis. A laser point in the Camera System Axis may be computed as follows.

$$\vec{cl} = kRT\vec{cL} \quad (8)$$

where:

$\vec{cl}$ is in the Camera System Axis; and $\vec{cL}$ is in the Laser System Axis $$\leftrightarrow \begin{pmatrix} xl + dx \\ Yl + dy \\ -c \end{pmatrix}_{\text{Camera System Axis}} = kR^T \begin{pmatrix} xl - x_c \\ yl - y_c \\ zl - z_c \end{pmatrix}_{\text{Laser System Axis}} \quad (9)$$

Moreover, L belongs to the Laser Plane, therefore:

$$x_{L=O} \quad (10)$$

Equations (9) and (10) generate three independent equations, allowing computation of the coordinates of the Laser Point (xL, yL, zL) in the Laser System Axis.

Figure 5:
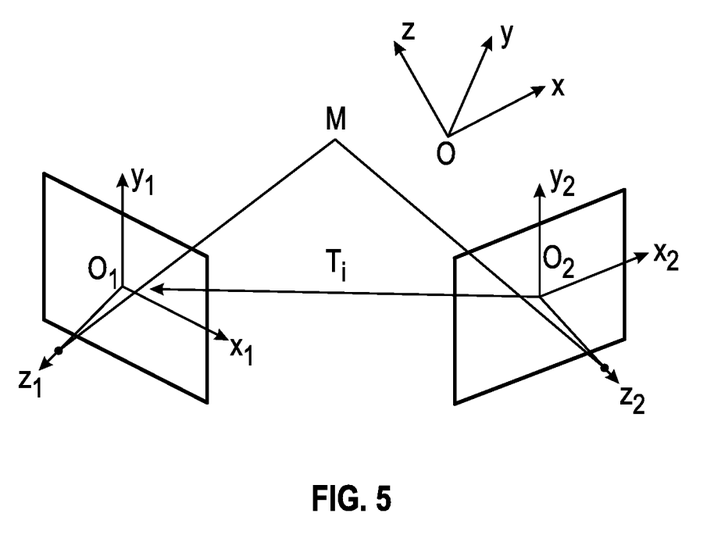
FIG. 5 shows an illustrative representation of positioning of a first camera with respect to a second camera in accordance with principles disclosed herein.

Because some embodiments of the system 100 include two cameras 102, 108, the processing system 112 can compute the position of camera 102 relative to camera 108. FIG. 5 shows an illustrative representation of positioning of a first camera (camera 102) with respect to a second camera (camera 108) in accordance with principles disclosed herein.

$$\begin{pmatrix} x \\ y \\ z \end{pmatrix}_2 = Ri \begin{pmatrix} x \\ y \\ z \end{pmatrix}_1 + \vec{Ti} \quad (11)$$

where:

Ti: Camera 1 position in the Camera 2 System Axis; and
Ri: Rotation Matrix of Camera 1 System Axis into Camera 2 System Axis.

The collinearity equations for the laser camera 102 can be defined without using the location of the laser camera 102. Instead, the collinearity equations for the laser camera 102 may be defined based on the position and orientation of the laser camera 102 relative to the pilot camera 108, which substantially reduces the number of parameters for the bundle adjustment.

The collinearity equations for the laser camera 102 are as follows:

$$\begin{pmatrix} x + dx \\ y + dy \\ -C_1 \end{pmatrix} = \lambda \left[ Ri^T \left[ R_2^T \begin{pmatrix} x - x2 \\ y - y2 \\ z - z2 \end{pmatrix} + \begin{pmatrix} 0 \\ 0 \\ C_2 \end{pmatrix} \right] - Ti + \begin{pmatrix} 0 \\ 0 \\ -C_1 \end{pmatrix} \right] \quad (12)$$

where:

(Ti,Ri) is the relative location of the laser camera with respect to the pilot camera;

$((X_2, Y_2, Z_2)^T, R_2)$ is the location of the pilot camera into the World System Axis;

$C_1$ and $C_2$ are the principal distances of the laser camera and the pilot camera.

Figure 6A:
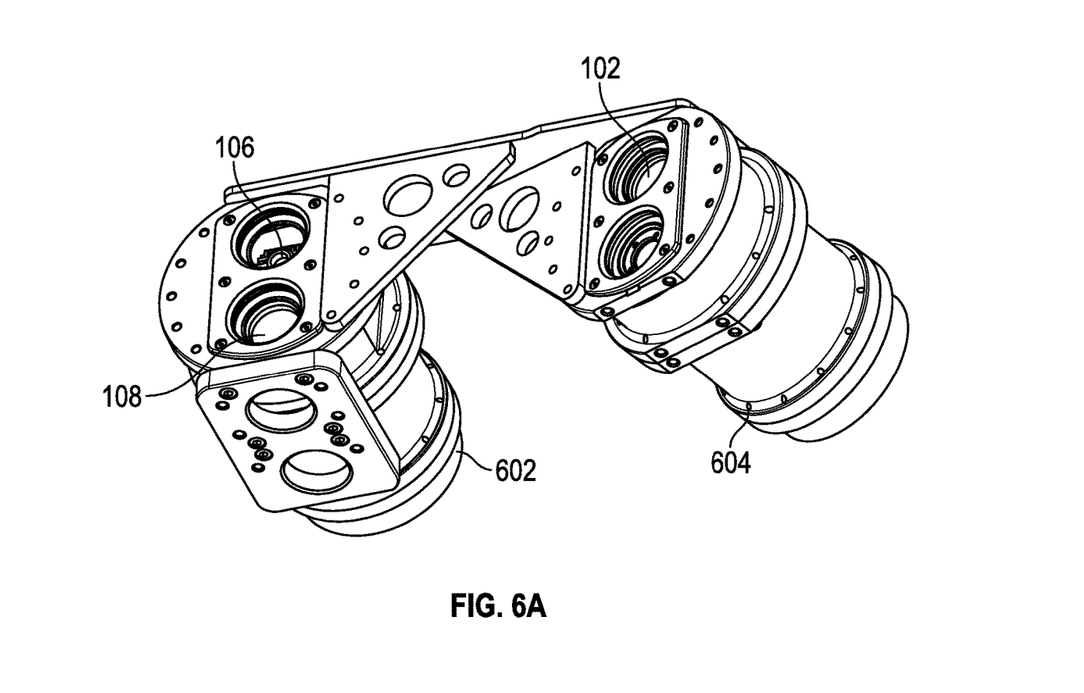
FIGS. 6A-6B show views of a measurement apparatus adapted for underwater use in accordance with principles disclosed herein.
Figure 6B:
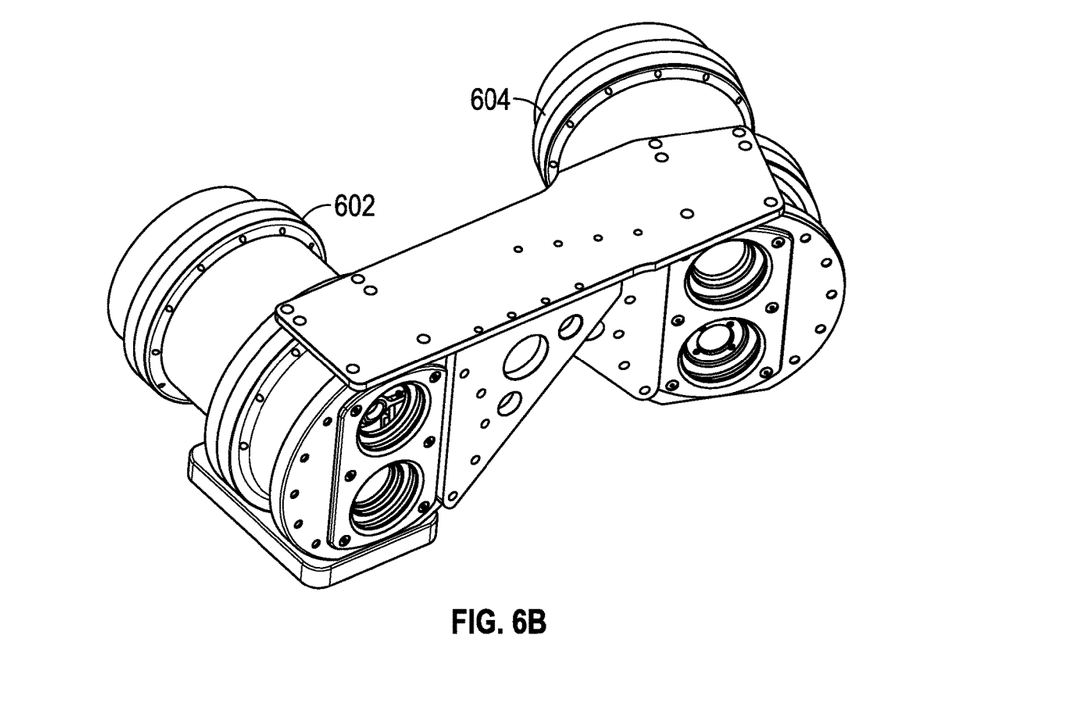
Figure 7A:
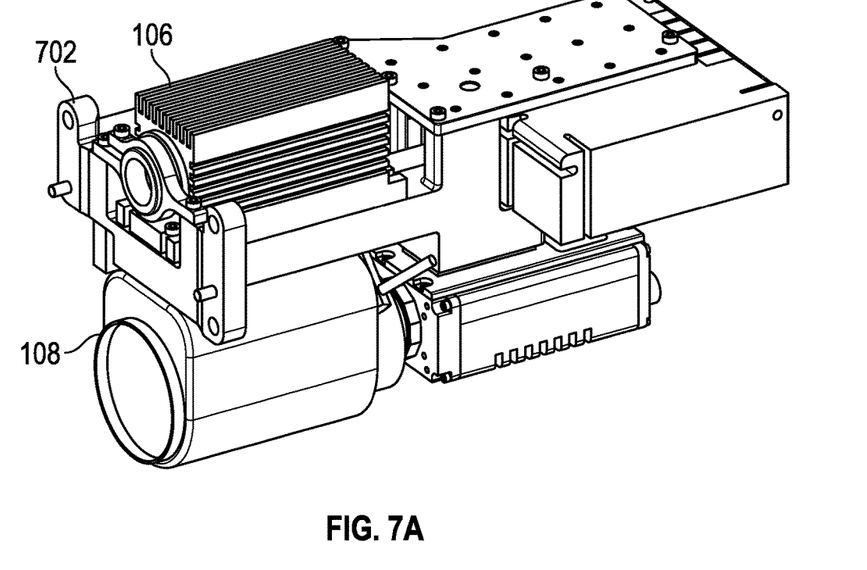
FIGS. 7A-7D show views of a camera and laser adapted for use in a measurement apparatus in accordance with principles disclosed herein.
Figure 7B:
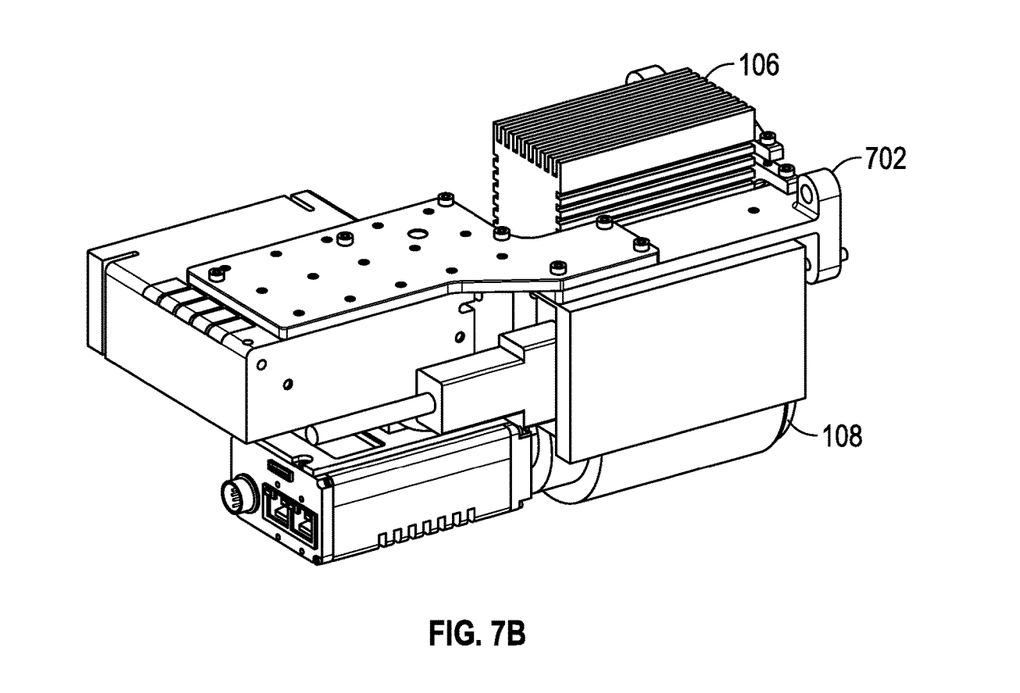
Figure 7C:
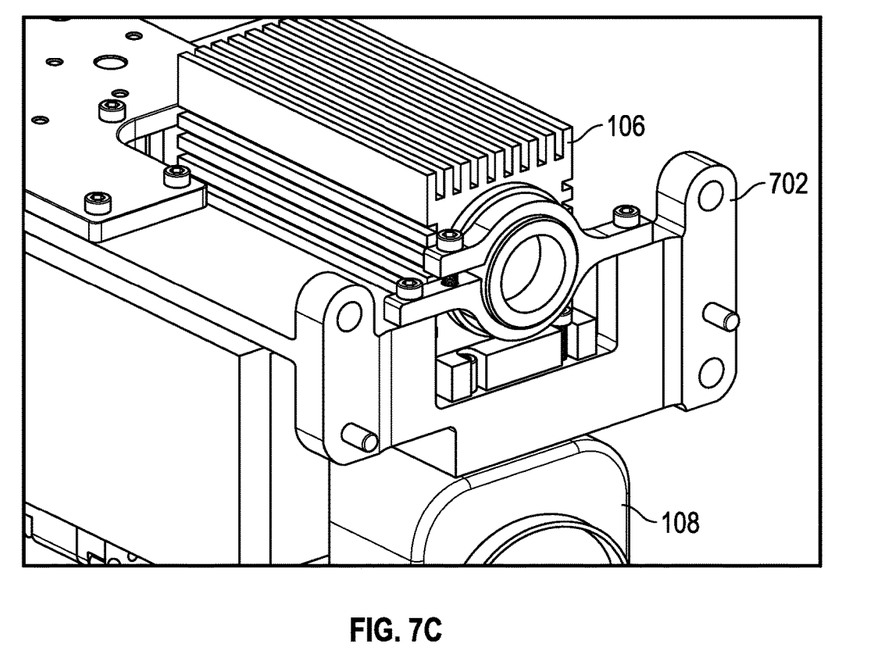
Figure 7D:
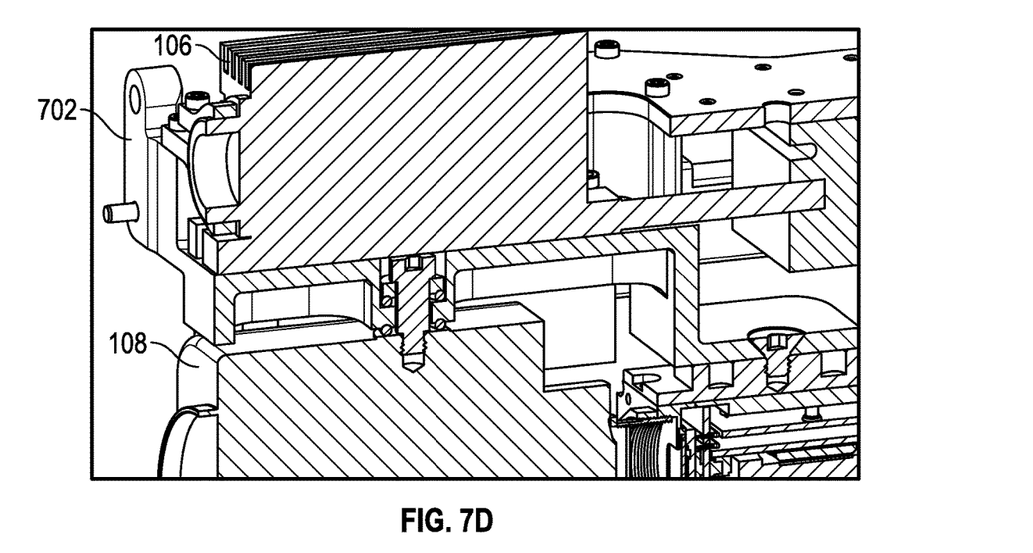

FIGS. 6A-6B show views of at least a portion of the measurement system 100 adapted for underwater use in accordance with principles disclosed herein. The laser projector 106 is disposed in a first canister or housing 602, and the camera 102 is disposed in a second housing 604.

FIGS. 7A-7D show views of a camera 108 and laser projector 106 adapted for use in a measurement system 100 in accordance with principles disclosed herein.

Figure 8A:
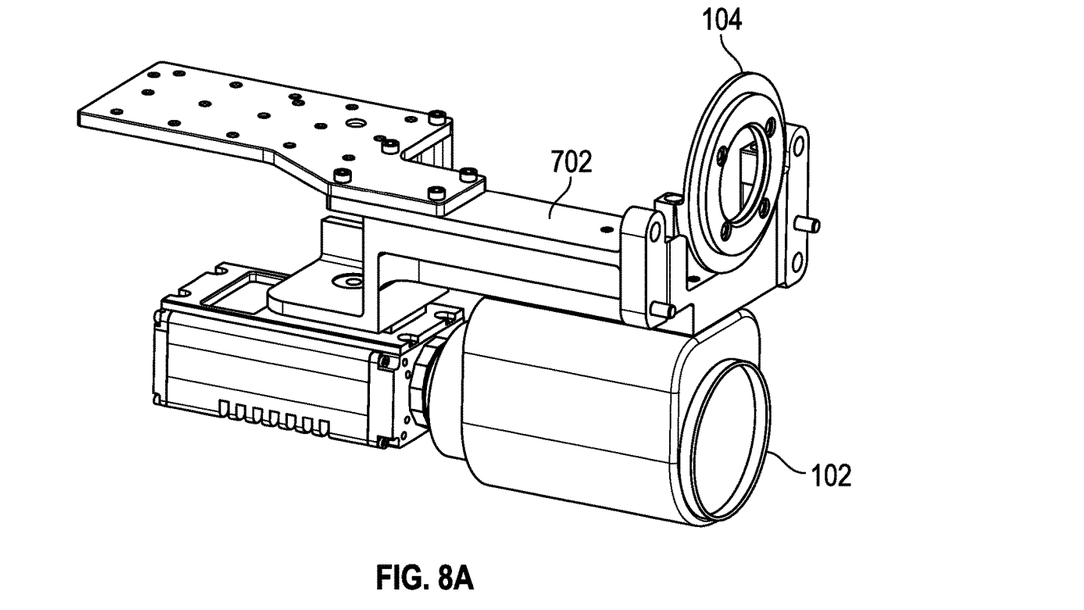
FIGS. 8A-8B show views of a camera and light emitting diode (LED) adapted for use in a measurement apparatus in accordance with principles disclosed herein.
Figure 8B:
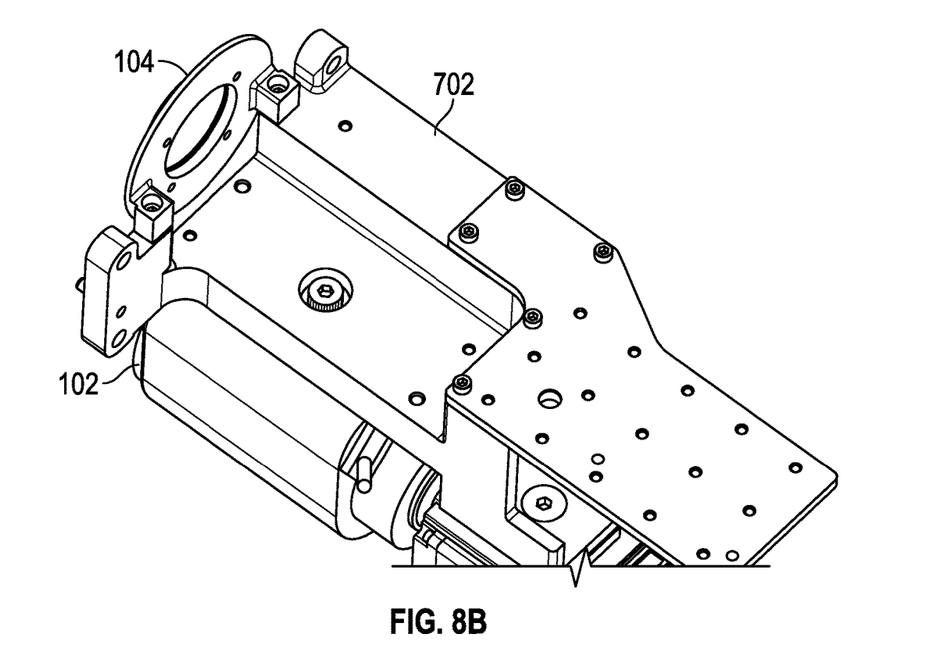
Figure 9A:
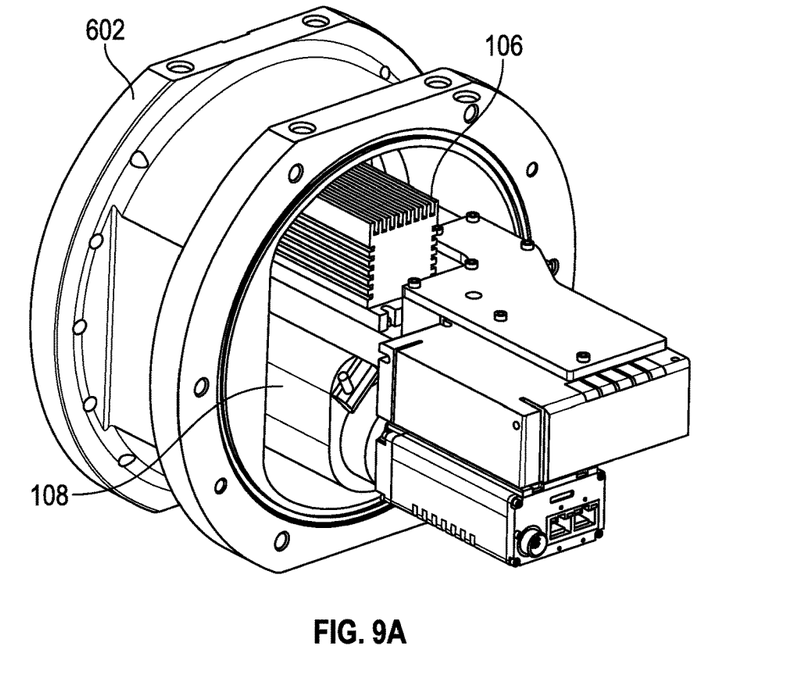
FIGS. 9A-9B show views of a camera and laser disposed in a front port for use in a measurement apparatus in accordance with principles disclosed herein.
Figure 9B:
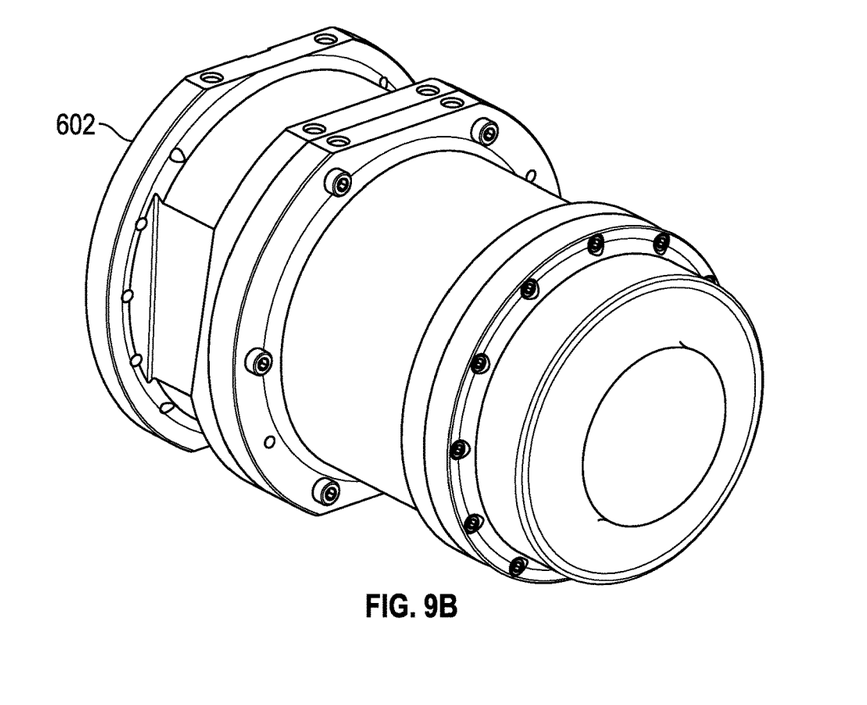

FIGS. 8A-8B show views of a camera and light emitting diode (LED) 104 adapted for use in the system 100 in accordance with principles disclosed herein;

FIGS. 9A-9B show views of a camera 108 and laser projector 106 disposed in a front port of housing 602 for use in a measurement system 100 in accordance with principles disclosed herein.

Figure 10:
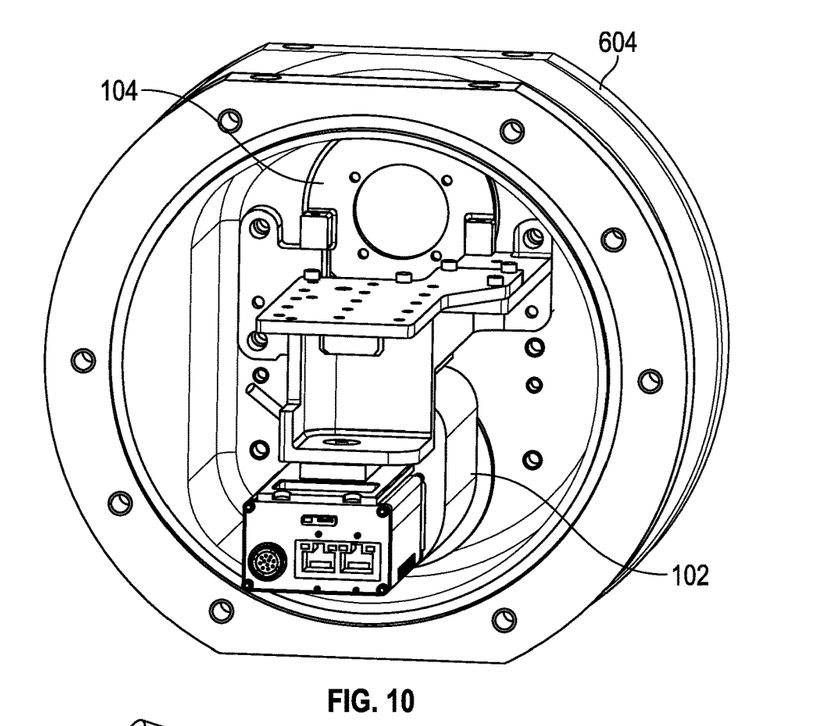
FIG. 10 shows a view of a camera and LED disposed in a front port for use in a measurement apparatus in accordance with principles disclosed herein.

FIG. 10 shows a view of a camera 102 and LED (light 104) disposed in a front port of housing 604 for use in a measurement system 10 in accordance with principles disclosed herein.

Figure 11A:
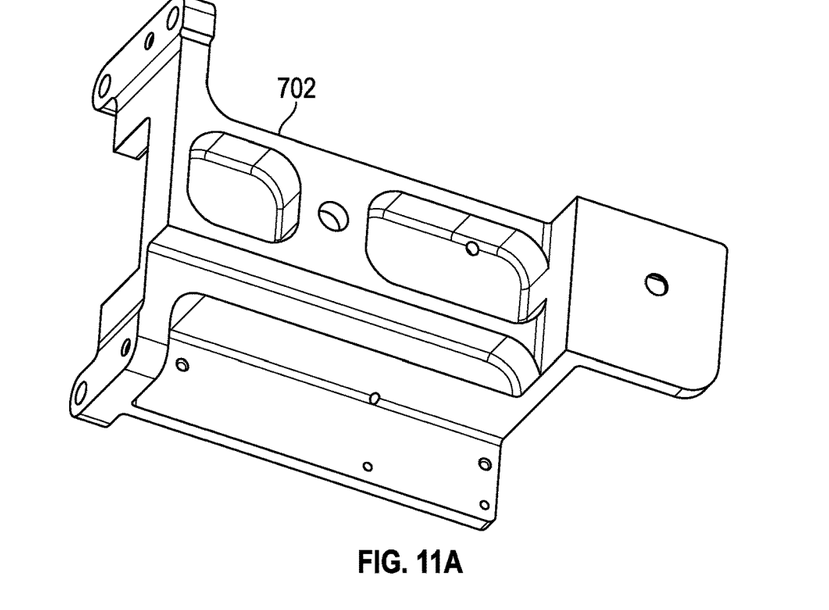
FIGS. 11A-11B show views of a bracket suitable for mounting a camera and laser (or LED) for use in a measurement apparatus in accordance with principles disclosed herein.
Figure 11B:
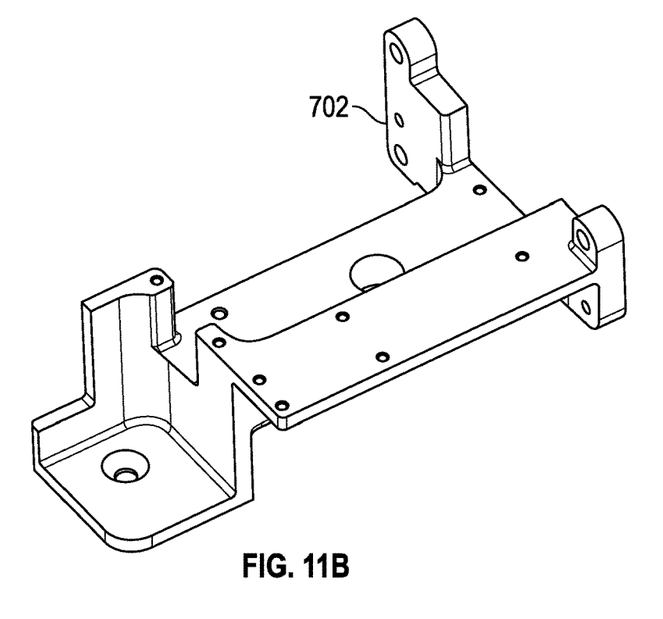

FIGS. 11A-11B show views of a bracket 702 suitable for mounting a camera 108 and laser projector 106 for use in a measurement system 100 in accordance with principles disclosed herein.

Figure 12:
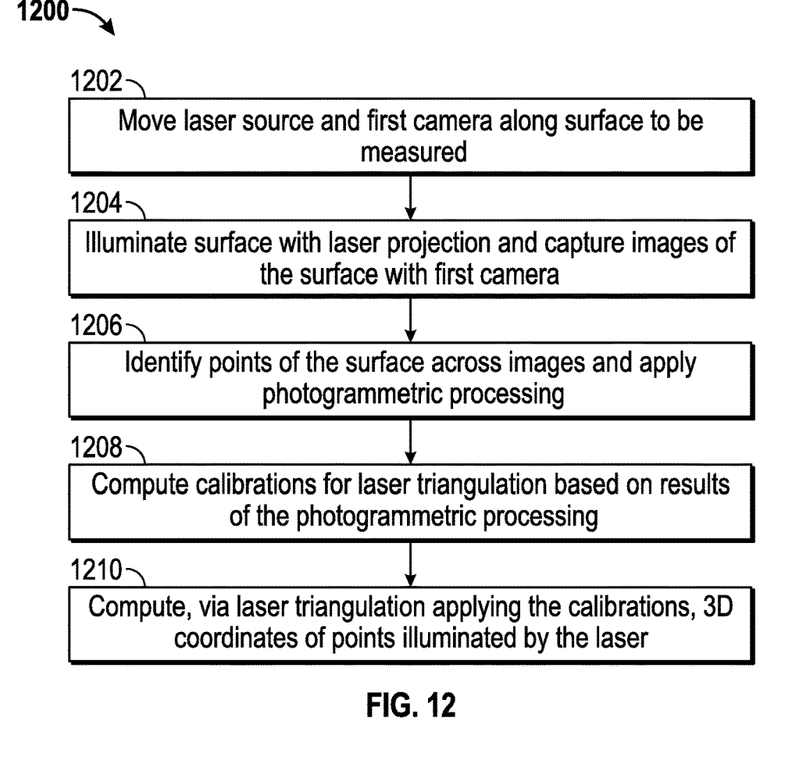
FIG. 12 shows a flow diagram for a method for laser triangulation in accordance with principles disclosed herein.

FIG. 12 shows a flow diagram for a method for laser triangulation in accordance with principles disclosed herein. Though depicted sequentially as a matter of convenience, at least some of the actions shown can be performed in a different order and/or performed in parallel. Additionally, some embodiments may perform only some of the actions shown. In some embodiments, at least some of the operations of the method can be encoded in instructions provided to the processor 114 as software programming stored in the computer readable storage device 116.

In block 1202, the measurement system 100, or a portion thereof, including the laser source 106 and the camera 102 are moved along a surface to be measured. Movement may be manual or by vehicle transport. For example, the measurement system 100, or relevant portion thereof, may be packaged in a pressure vessel or other housing and transported along a surface to be measured by a remotely operated vehicle.

In block 1204, the laser source 106 emits a laser projection that illuminates the surface to be measured. The laser projection may form a plane in space and a line on the surface. The camera 102 captures images of the surface illuminated by the laser projection. For example, the camera 102 may capture high-definition video of the surface and the laser projection. In some embodiments, additional illumination of the surface may be provided by a light source 104 associated with the camera 102. The generation of the laser projection and the capture of images may be controlled by the processing system 112.

In block 1206, the processing system 112 applies image processing techniques to identify points and/or features across the captured images. Having identified common points across the images, the processing system 112 applies photogrammetric processing to the images. The photogrammetric processing determines the 3D coordinates of the points, and the 3D coordinates and orientation of the camera 102. The processing system 112 may also compute the optical parameters of the camera 102.

In block 1208, the processing system 112 computes calibrations for the laser triangulation based on the results of the photogrammetric processing. The processing system 112 determines the location of the laser projection with respect to the camera 102.

In block 1210, the processing system 112 computes via laser triangulation, applying the calibrations, the 3D coordinates of points on the surface illuminated by the laser projection.

In some embodiments, a method for 3D measurement and modeling of objects and surfaces in any environment includes:
  providing an assembly of at least one camera and one laser line projector assembled on a support;
  moving around the measurement scene and taking a video of the measurement scene with the laser line projected on the object;
  manually or automatically:
    extracting images from the video;
    determining correlation points between images;
    determining 3D (xyz) coordinates of correlation points;
    determining optical parameters of the camera;
    determining locations of the camera;
    determining relative position and orientation of the laser plane with respect to the camera; and
    determining 3d coordinates (xyz) of laser triangulation points.

In some embodiments, a method for 3D measurement and modeling of objects and surfaces in any environment includes:
  providing still images or video images (High Definition or not) by a camera;
  wherein a plurality of cameras may be mounted and used, allowing stereovision and additional measurements; and
  providing a pattern projection, such as a laser line.

In some embodiments, a system for 3D measurement and modeling of objects and surfaces in any environment includes:
  a camera;
  a laser;
  a self-calibration module that integrates in each measurement modeling of the opto-mechanical parameters of the camera and relative location and orientation of the laser with respect to the camera;
  a self-calibration module that takes into account optical deviation due to media (air, optical glass, water); and
  a self-calibration module extended to any zoom position.

The above discussion is meant to be illustrative of various principles and embodiments of the present disclosure. While certain embodiments have been shown and described, modifications thereof can be made by one skilled in the art without departing from the spirit and teachings of the disclosure. The embodiments described herein are exemplary only, and are not limiting. Accordingly, the scope of protection is not limited by the description set out above, but is only limited by the claims which follow, that scope including all equivalents of the subject matter of the claims.

What is claimed is:

1. A measurement system for three-dimensional measurement of a subsea structure, comprising:
  a laser projector and a first camera packaged for subsea operation;
  wherein the laser projector is configured to emit a laser projection onto a surface of the subsea structure for laser triangulation;
  wherein the first camera is configured to provide images of the surface, and is disposed at an oblique angle with respect to the laser projector;
  a processor configured to:
    apply photogrammetric processing to the images captured subsea;
    compute calibrations for laser triangulation based on a result of the photogrammetric processing of the images captured subsea, wherein the calibrations include determination of:
      orientation of a laser plane projected by the laser projector with respect to the first camera; and
      opto-mechanical parameters of the first camera, the parameters comprising principal distance, fiducial center, radial distortion, decentering distortion, and distortion relating to orthogonality of pixels of an image sensor in the first camera; and
    compute, based on the calibrations, coordinates of points of the surface illuminated by the laser projection via laser triangulation; and
  a second camera configured to capture images of the surface, and disposed such that an optical axis of the second camera is approximately parallel to emission of the laser projector.

2. The system of claim 1, wherein the first camera is mounted relative to the laser projector such that an optical axis of the first camera intersects the laser projection at approximately a 30 degree angle.

3. The system of claim 1, wherein the first camera is configured to capture video and the processor is configured to extract pictures from the video as the images.

4. The system of claim 1, wherein the processor is configured to, as part of the photogrammetric processing:
  identify points of the surface across the images provided by the first camera;
  compute coordinates of the points in three dimensions; and
  determine location and orientation of the first camera with respect to the coordinates.

5. The system of claim 1, wherein the processor is configured to, as part of the photogrammetric processing, determine a location of the first camera relative to location of the second camera.

6. The system of claim 1, wherein the laser projection forms a line on the surface.

7. A method for three-dimensional measurement of a subsea structure, comprising:
  disposing subsea an apparatus comprising a first camera and laser source;
  capturing images of a surface of the subsea structure, via the first camera, as the first camera moves along the surface;
  illuminating the surface with a laser projection produced by the laser source, wherein the laser source moves along the surface in conjunction with the first camera;

applying photogrammetric processing to the images captured subsea;
computing calibrations for laser triangulation based on a result of the photogrammetric processing of the images captured subsea, wherein the calibrations include determining:
orientation of a laser plane projected by the laser projector with respect to the first camera; and
opto-mechanical parameters of the first camera, the parameters comprising principal distance, fiducial center, radial distortion, decentering distortion, and orthogonality of pixels of an image sensor in the first camera;
computing, via the laser triangulation, coordinates of points of the surface illuminated by the laser projection based on the calibrations; and
capturing images of the surface, via a second camera, as the first camera moves along the surface;
wherein the second camera is disposed such that an optical axis of the second camera is approximately parallel to emission of the laser source.

8. The method of claim 7, wherein the first camera is mounted relative to the laser source such that an optical axis of the first camera intersects the laser projection at approximately a 30 degree angle.

9. The method of claim 7, further comprising capturing video, by the first camera, and extracting the images captured via the first camera from the video.

10. The method of claim 7, wherein the applying photogrammetric processing comprises:
identifying points of the surface across the images captured via the first camera;
computing coordinates of the points in three dimensions; and
determining location and orientation of the first camera with respect to the coordinates.

11. The method of claim 7, wherein the applying photogrammetric processing comprises determining a location of the first camera relative to a location of the second camera.

12. The method of claim 7, wherein illuminating the surface with a laser projection comprises projecting a laser line on the surface.

13. A non-transitory computer readable medium encoded with instructions that when executed cause a processor to:
extract images of a subsea surface from an image stream captured by a first subsea camera;
apply photogrammetric processing to the images captured subsea;
compute calibrations for laser triangulation based on a result of the photogrammetric processing of the images captured subsea, wherein the calibrations include determination of:
orientation of a laser plane projected by the laser projector with respect to the first camera; and
opto-mechanical parameters of the first camera, the parameters comprising principal distance, fiducial center, radial distortion, decentering distortion, and orthogonality of pixels of an image sensor in the first camera;
compute, via laser triangulation, based on the calibrations, coordinates of points of the subsea surface illuminated by a laser projection captured in the images;
extract images of the surface from an image stream received from a second camera; and
determine a location of the first camera relative to a location of the second camera.

14. The computer readable medium of claim 13 encoded with instructions that when executed cause a processor to, as part of the photogrammetric processing:
identify points of the surface across the images captured subsea;
compute coordinates of the points in three dimensions; and
determine location and orientation of the first camera with respect to the coordinates.

15. The computer readable medium of claim 13 encoded with instructions that when executed cause a processor to, as part of computing the calibrations for laser triangulation, determine
an optical deviation caused by media between the first camera and the surface.

16. The computer readable medium of claim 13 encoded with instructions that when executed cause a processor to trigger a laser source to generate the laser projection; wherein the laser projection forms a line on the surface.

* * * * *